United States Patent [19]

Bott

[11] Patent Number: 5,301,855

[45] Date of Patent: * Apr. 12, 1994

[54] ARTICLE CARRIER

[76] Inventor: John A. Bott, 931 Lakeshore Dr., Grosse Pointe Shores, Mich. 48236

[*] Notice: The portion of the term of this patent subsequent to Apr. 14, 2009 has been disclaimed.

[21] Appl. No.: 771,035

[22] Filed: Oct. 2, 1991

Related U.S. Application Data

[63] Continuation of Ser. No. 591,722, Oct. 2, 1990, Pat. No. 5,104,019, which is a continuation of Ser. No. 246,770, Sep. 20, 1988, Pat. No. 4,972,983.

[51] Int. Cl.$^5$ .............................................. B60R 9/00
[52] U.S. Cl. .................................... 224/324; 224/321
[58] Field of Search ............... 224/325, 326, 309, 321, 224/324, 327, 315, 329, 330, 331, 323, 316; 410/104, 105, 113, 150; 296/180.1, 90; 248/503

[56] References Cited

U.S. PATENT DOCUMENTS

| | | |
|---|---|---|
| Re. 26,539 | 3/1969 | Bott . |
| 3,542,264 | 11/1970 | Meyer et al. . |
| 4,170,322 | 10/1979 | Bott ..................... 224/326 |
| 4,274,570 | 6/1981 | Bott . |
| 4,295,587 | 10/1981 | Bott . |
| 4,323,182 | 4/1982 | Bott . |
| 4,364,500 | 12/1982 | Bott . |
| 4,406,386 | 9/1983 | Rasor et al. . |
| 4,456,158 | 6/1984 | Wertz et al. . |
| 4,460,116 | 7/1984 | Bott . |
| 4,473,178 | 9/1984 | Bott . |
| 4,500,020 | 2/1985 | Rasor . |
| 4,516,710 | 5/1985 | Bott . |
| 4,684,048 | 8/1987 | Bott . |
| 4,754,905 | 7/1988 | Bott . |
| 4,877,168 | 10/1989 | Bott . |
| 4,883,208 | 11/1989 | Bott . |
| 4,899,917 | 2/1990 | Bott . |
| 4,903,876 | 2/1990 | Bott . |
| 4,911,348 | 3/1990 | Rasor et al. . |
| 4,967,945 | 11/1990 | Bott . |

FOREIGN PATENT DOCUMENTS

| | | |
|---|---|---|
| 2925684 | 1/1981 | Fed. Rep. of Germany . |
| 3528569A1 | 2/1987 | Fed. Rep. of Germany . |

OTHER PUBLICATIONS

Copending application Ser. No. 550,107, filed Jul. 6, 1990 entitled Article Carrier.
Copending application Ser. No. 769,867, filed Oct. 1, 1991 entitled Article Carrier.
Copending application Ser. No. 591,722, filed Oct. 2, 1990 entitled Article Carrier.

Primary Examiner—Linda J. Sholl
Attorney, Agent, or Firm—Harness, Dickey & Pierce

[57] ABSTRACT

The present invention is an article carrier for an automobile including two side rails fixedly secured on a generally horizontal extending exterior automobile body surface. The side rails extend generally longitudinally of the automobile. A pair of bracket members are disposed on the side rails and a cross bar extends laterally between and secured adjacent its opposite ends to the bracket members. A means on each of the article securing members cooperates with the side rails for detachably securing and longitudinally adjusting the cross bar upon the side rails.

7 Claims, 3 Drawing Sheets

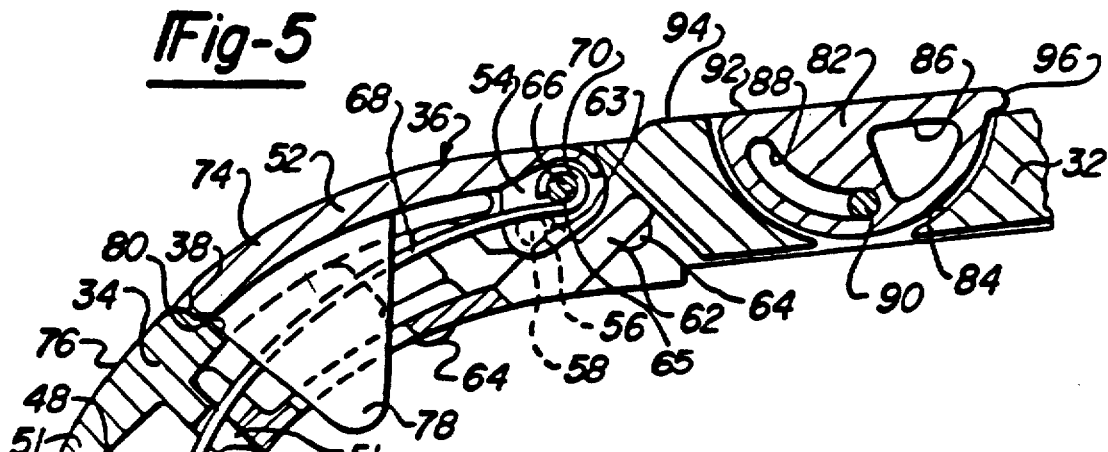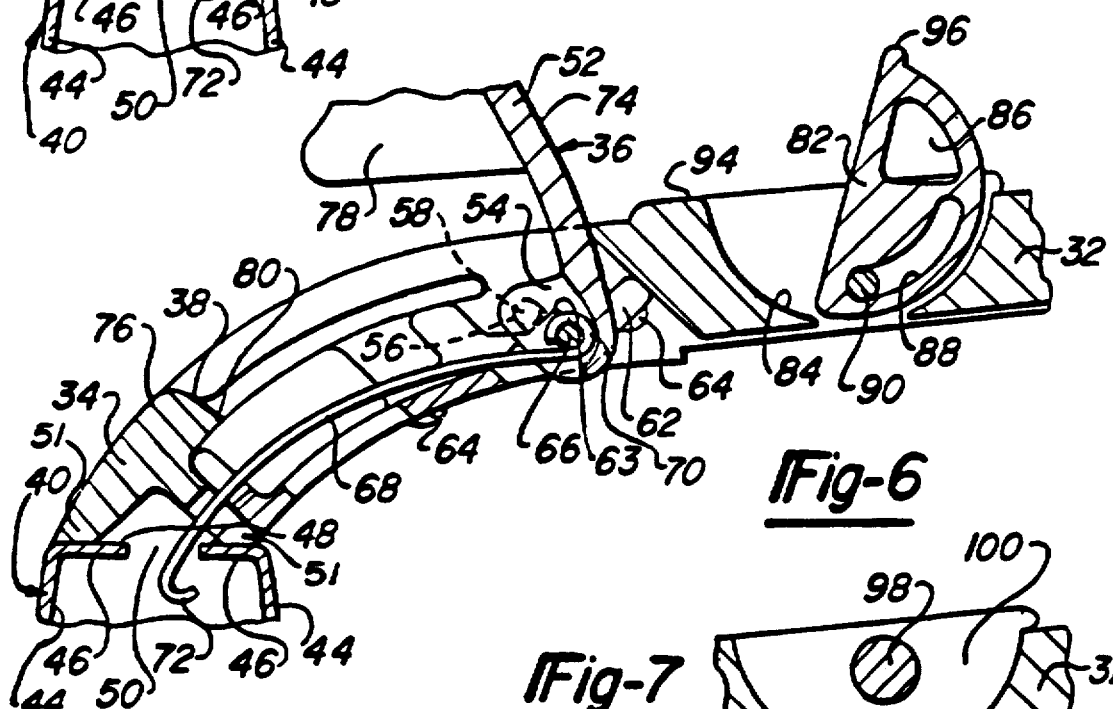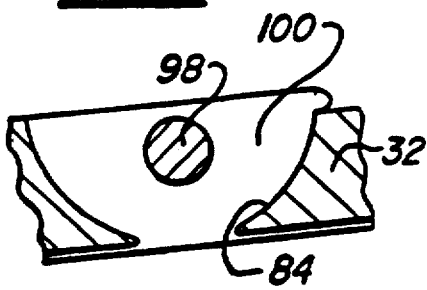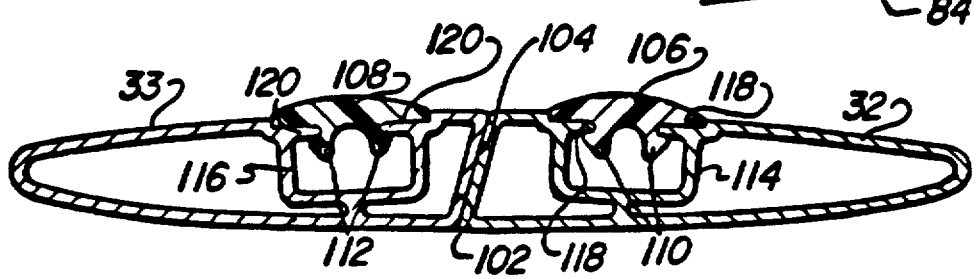

ARTICLE CARRIER

This is a continuation of U.S. patent application Ser. No. 07/591,722, filed Oct. 2, 1990, now U.S. Pat. No. 5,104,019 entitled "ARTICLE CARRIER", which is a continuation of Ser. No. 07/246,770, filed Sep. 20, 1988, entitled ARTICLE CARRIER now U.S. Pat. No. 4,972,983.

BACKGROUND OF THE INVENTION

1. Field of the Invention

The present invention relates to an article carrier for automotive vehicles, more particularly, to an adjustable cross bar for an article carrier on an automotive vehicle.

2. Description of Related Art

Automobile luggage racks frequently employ two separate subassemblies or portions: a rectangular framework which surrounds the load to be carried and a plurality of slats which rest on the roof or other automobile body surface and carries the weight of the load. In such constructions, the framework and the slats are often secured to the automobile body independently of one another. In still another automobile luggage or article carrier, a cross bar replaces the framework as a means for confining the luggage upon the slats.

In my prior U.S. Pat. No. 4,182,471, I disclosed an article carrier for automotive vehicles having crossbars which can be adjusted on the slats and are easily removed, interchanged or adjusted in position on the slats in accordance with the needs of the user. This construction has achieved significant commercial success. Nevertheless, some problems have been experienced in providing an aesthetically pleasing and more simple to use rack. Therefore, it is believed that a need exists for a cross bar which has an attractive appearance of modern luggage carriers but which possesses a greater degree of adjustability and ease of operation. Additionally, it is believed that a need exists for a cross bar that can be stored when not in use and act as an air foil.

SUMMARY OF THE INVENTION

The present invention is an article carrier for an automobile including two side rails fixedly secured on a generally horizontal extending exterior automobile body surface. The side rails extend generally longitudinally of the automobile. A pair of bracket members are disposed on the side rails and a cross bar extends laterally between and secured adjacent its opposite ends to the bracket members. A means on each of the article securing members cooperates with the side rails for detachably securing and longitudinally adjusting the cross bar upon the side rails.

One advantage of the present invention is a cross bar which is attractive in appearance with a greater degree of adjustability and ease of operation. Another advantage of the present invention is a cross bar that can be stored when not in use at one end of the luggage rack and act as an airfoil.

BRIEF DESCRIPTION OF THE DRAWINGS

FIG. 5 is a sectional view of the structure illustrated in FIG. 3 taken along line 5—5 thereof showing a locking member in a closed position;

FIG. 6 is a view of the structure similarly illustrated in FIG. 5 showing the locking member in an open position;

FIG. 7 is a sectional view of an alternate tie-down member of the structure illustrated in FIGS. 5 and 6; and FIG. 8 is a sectional view of the structure illustrated in FIG. 4 taken along line 8—8 thereof.

DESCRIPTION OF THE PREFERRED EMBODIMENT

Figure 1:
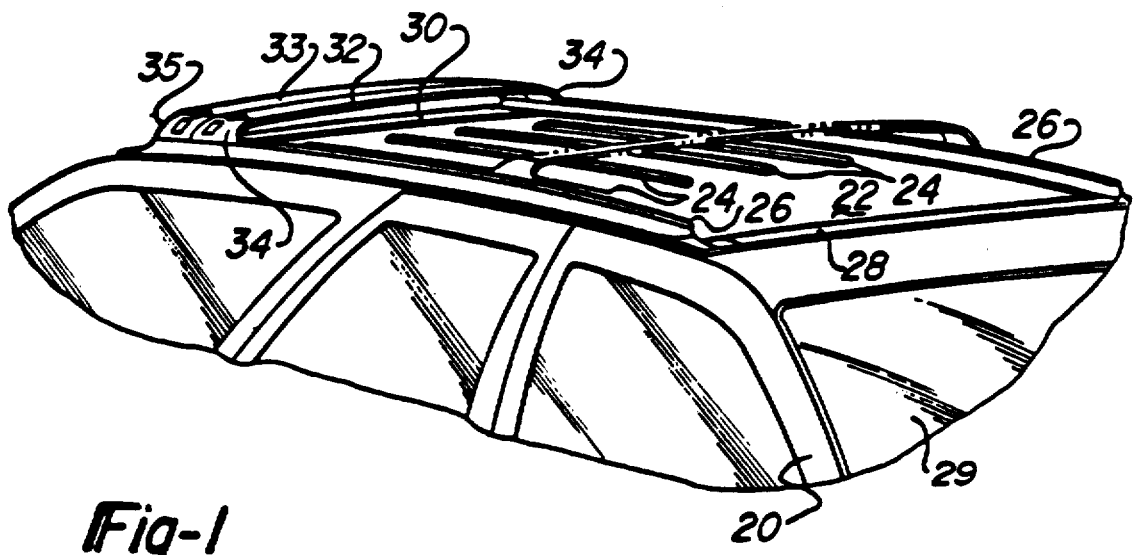
FIG. 1 is a fragmentary perspective view of an automobile showing an article carrier mounted thereon which is constructed in accordance with the principles of the present invention.

FIG. 1 depicts an automobile 20 having a roof 22 on which are mounted a plurality of identical, parallel, transversely spaced slats 24. Although the slats 24 are shown mounted on the roof 22, the article carrier of the present invention may be mounted with equal utility on an automobile trunk lid or any other generally horizontal exterior body portion of an automobile. The slats 24 are secured on the roof 22 by means of sheet metal screws (not shown). The article carrier also includes a pair of parallel, transversely spaced side rails 26. Each of the side rails 26 are disposed on the other side of the outermost slat 24 such that the slats 24 are transversely spaced between the side rails 26. A front rail member 28 is disposed between and generally perpendicular to the front ends of the side rails 26 and has a configuration that cooperates with the aerodynamic shape of a glass airfoil 29. A rear rail member 30 is disposed between and generally perpendicular to the rear ends of the side rails 26. The side rails 26 and members 28 and 30 are secured on the roof 22 by means of sheet metal screws (not shown). Mounted on the side rails 26 are a pair of raised tubular cross bars 32 and 33 which are fitted at their opposite ends onto brackets 34 and 35, respectively.

Figure 2:
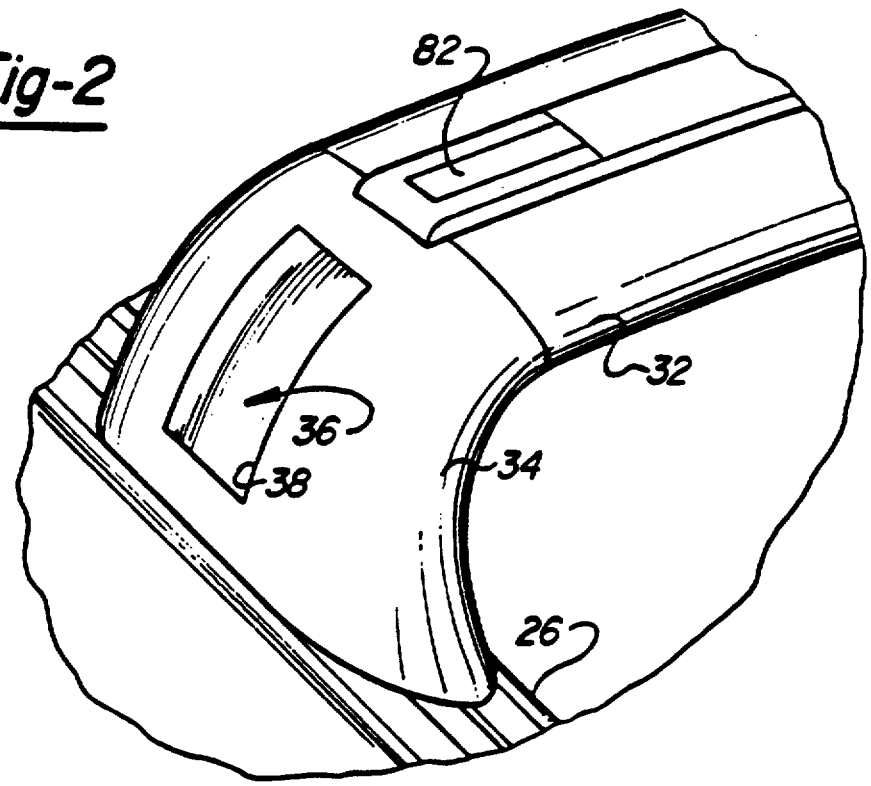
FIG. 2 is an enlarged perspective view of a portion of the structure illustrated in FIG. 1.

FIG. 2 depicts only one of the brackets 34 and a portion of the cross bar 32. Brackets 35 and cross bar 33 are similar structurally and functionally to brackets 34 and crossbar 32. The differences between these members will be explained further subsequently. The bracket 34 includes a locking member 36 for locking the cross bar 32 into position along the side rail 26. The locking member 36 allows the cross bar 32 to be positioned operably at any location or infinitely along the length of the side rail 26. When not in use, the locking member 36 is pivotally disposed to a closed position stored within a cavity or pocket 38 of the bracket 34 as illustrated in FIG. 5.

Referring to FIGS. 3 through 6, the side rail 26 includes a channel member 40. The channel member 40 comprises a bottom wall 42 and a pair of generally parallel upwardly extending side walls 44 with inwardly extending ledges 46 at the upper ends of the side walls 44. The ledges 46 include an upper supporting surface 48. The bottom 42 and side 44 walls and ledges 46 form an upwardly opening channel 50 which is wider at its bottom than at the top. The bracket 34 includes a pair of laterally spaced feet 51 at the bottom thereof which slide along the upper supporting surface 48 of the channel member 40. The feet 51 form a configuration similar to a triangle in cross section.

Figure 3:
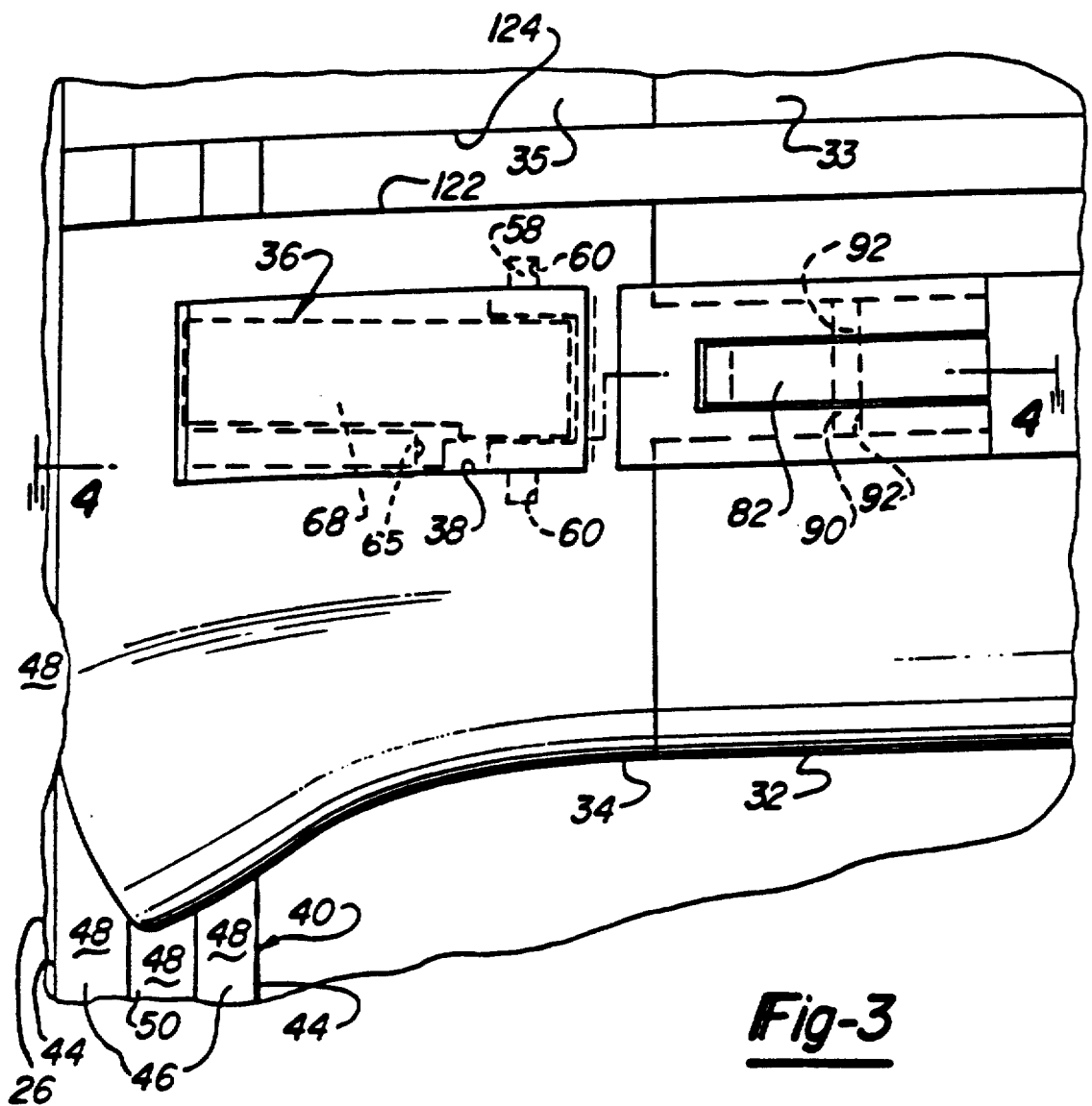
FIG. 3 is a plan view of the structure illustrated in FIG. 2.
Figure 4:
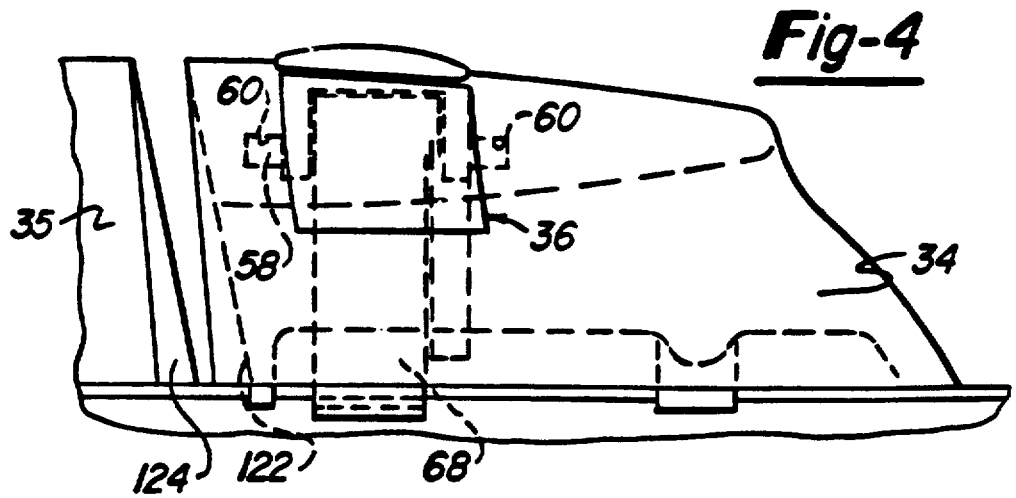
FIG. 4 is a side elevational view of the structure illustrated in FIG. 3.

The locking member 36 comprises a wall portion 52 and a base portion 54 at one end of the wall portion 52. The base portion 54 includes means forming a first aperture 56 in it and a corresponding shaft 58 passing through the first aperture 56. The shaft 58 has its ends disposed in corresponding second apertures 60 formed in the bracket 34 (FIG. 3 and 4). A retainer member 62 which is secured by screws 64 to the bracket 34 such that a shoulder 63 retains the corresponding shaft 56 in the second apertures 60. The shaft 58 allows the locking member 36 to to be manually moved or rotated from a closed locking position of FIG. 5 to an open unlocked position of FIG. 6.

The locking member 36 also includes means forming a third aperture 65 transversely in the base portion 54. A second shaft 66 is disposed in the third aperture 65. A spring member 68 has one end 70 wrapped or disposed about the second shaft 66 and a U-shaped end 72 opposite the one end 70 which cooperates with the ledge 46 on the channel member 40. The spring member 68 flexes to engage the ledge 46 to secure the bracket 34 to the channel member 40 when the locking member 36 is in the closed position. As illustrated in FIG. 6, when the locking member 36 is moved to the open position, the spring member 68 flexes and the U-shaped end 72 of the spring member 68 disengages the ledge 46 to allow the bracket 34 to slide along the channel member 40 of the side rail 26.

Referring to the locking member 36, the wall portion 52 is generally arcuate and has an outer surface 74 which is generally flush with the outer surface 76 of the bracket member 34 in the closed position. The wall portion 52 also includes a protrusion 78 which is generally triangular in cross section and extends inwardly toward the roof 22. The protrusion 78 passes through an aperture 80 formed in the bracket member 34 when the locking member 36 is in the closed position.

As illustrated in FIGS. 5 and 6, the cross bar 32 includes a tie-down or article securing member 82 which has a generally hemispherical cross section and is disposed in a corresponding cavity 84 formed in the cross bar 32. The tie-down member 82 includes an eyelet 86 formed therein to allow a rope or the like to pass through it. The tie-down member 82 includes an arcuate slot 88 formed therein to allow a shaft member 90 to pass through it and is disposed in corresponding apertures 92 (FIG. 3) formed in the cross bar 32.

The tie-down member 82 pivots about the shaft member 90 and is limited by the ends of the slot 88. The tie-down member 82 pivots between a closed position of FIG. 5 and an open position of FIG. 6. In the closed position, the outer surface 92 is substantially flush with the outer surface 94 of the cross bar 32. The tie-down member 82 also includes a flange 96 at one end for limiting the pivotal movement of the tie-down member 34 to the closed position.

FIG. 7 depicts an alternate embodiment of the article securing or tie-down member. A shaft or pin 98 is disposed in the cavity 84 and fixedly secured by suitable means to the cross bar 32. This allows a rope or the like to pass through a passage 100 formed between the pin 98 and the wall forming the cavity 84.

As illustrated in FIG. 8, the cross bars 32 and 33 have a generally elliptical cross-section with one end 102 and 104,, respectively, being planar and inclined. The ends 102 and 104 operatively cooperate or mate with each other to allow the cross bars 32 and 33 to nest together as further illustrated in solid in FIG. 1. The cross bars 32 and 33 may be nested together and disposed at one end of the side rails 26 to act as an airfoil when not in use. This improves the aerodynamics of the article carrier.

The cross bars 32 and 33 also include corresponding plastic strips 106 and 108 having ends 110 and 112, respectively, disposed in channels 114 and 116 formed along the cross bars 32 and 33. The ends 110 and 112 are flexible and resilient such that when they are inserted into the channels 114 and 116, the ends 110 and 112 overlap ledges 118 and 120 of the channels 114 and 116, respectively.

Referring to FIGS. 3 and 4, the brackets 34 and 35 include one end 122 and 124 being planar and inclined. The ends 122 and 124 opertively cooperate or mate with each other to allow the cross bars 32, 33 and brackets 34, 35 to nest together in a nested position as illustrated in solid in FIG. 1. As shown in phantom, the cross bars 32, 33 and brackets 34, 35 can be placed in an unnested position.

The present invention has been described in an illustrative manner. It is to be understood that the terminology which has been used is intended to be in the nature of words of description rather than of limitation.

Obviously, many modifications and variations of the present invention are possible in light of the above teachings. Therefore, within the scope of the appended claims, the present invention may be practiced otherwise than as specifically described.

I claim:

1. An article carrier for an automobile comprising:
   a plurality of parallel slats fixedly secured on a generally horizontally extending exterior automobile body surface;
   said slats extending generally longitudinally of the automobile;
   a pair of bracket members disposed upon a pair of said slats;
   at least one restraining bar extending laterally between and secured adjacent its opposite ends to said bracket members;
   said restraining bar including a semi-circular, upwardly opening cavity formed therein;
   article securing means disposed within said semi-circular cavity for facilitating securing of an object to said restraining bar, retaining means disposed within said cavity for captively retaining said article securing means within said cavity; said retaining means enabling said article securing means to move slidably in a semi-circular path in accordance with said semi-circular cavity without being completely removed from said semi-circular cavity;
   said article securing means including a securing portion adapted to couple to a securing implement, and an upper surface, said upper surface of said article securing means being relatively flush with an outer surface of said restraining bar, and said securing portion being hidden within said cavity when said article securing means is in a closed position, and said article securing means being movable to an open position by a force exerted on a portion of said upper surface, whereby said article securing means is slidably urged so as to move said securing portion outwardly of said cavity, to an open position wherein said upper surface of said article securing means protrudes outwardly of said outer surface of said restraining means.

2. The article carrier of claim 1, wherein said slidable movement of said article securing means between said opened and closed positions is restricted in accordance with an elongated slot operably associated with said article securing means.

3. The article carrier of claim 2, wherein said retaining means includes a shaft member extending perpendicularly at least partially through said restraining bar and said elongated slot, said shaft member operating in cooperation with said elongated slot to limit said open and closed slidable movement of said article securing means to predetermine distances.

4. The article carrier of claim 2, wherein said elongated slot comprises a partially arcuate, elongated slot.

5. For a restraining bar of an article carrier apparatus, wherein said article carrier apparatus is adapted for use in connection with an outer surface of a vehicle, an article securing apparatus, said article securing apparatus comprising:

an article securing member disposed within a cavity of said restraining bar, said article securing member having a top surface, and an article securing portion adapted to enable securing a tie down member thereto;

said article securing member being movable slidably from a closed position in response to a force exerted on said upper surface of said article securing member, wherein said upper surface is disposed relatively flush with an outer surface of said restraining bar, to an open position, wherein said upper surface of said article securing member extends outwardly of said outer surface of said restraining bar to enable access to said securing portion;

retaining means fixedly secured within said cavity for retaining said article securing means therein; and said sliding movement of said article securing member between said open and closed positions being defined in accordance with a curved elongated slot operably associated with said article securing member.

6. The article securing apparatus of claim 5, wherein said retaining means comprises a shaft member extending generally longitudinally relative to said roof of said vehicle and generally perpendicular to said restraining bar, said shaft member extending at least partially into said elongated slot to thereby limit said open and closed sliding movement of said article securing member to a distance in accordance with a length of said elongated slot.

7. The article securing apparatus of claim 5, wherein securing portion of said article securing member includes an eyelet for facilitating connecting of a cord-like member to said article securing member.

* * * * *

UNITED STATES PATENT AND TRADEMARK OFFICE
CERTIFICATE OF CORRECTION

PATENT NO. : 5,301,855

DATED : Apr. 12, 1994

INVENTOR(S) : John A. Bott

It is certified that error appears in the above-indentified patent and that said Letters Patent is hereby corrected as shown below:

Col. 1, Line 8, "ARTICLE CARRIER" should be --"ARTICLE CARRIER"-- (add quotation marks);

Col. 2 Line 62, "side 44 walls" should be --side walls 44--;

Col. 3, Line 9, "shaft 56" should be --shaft 58--;

Col. 3, Line 11, delete second occurrence of "to";

Col. 3, Line 65, "104,," should be --104,--;

Col. 5, Line 10, Claim 3, "predetermine" should be --predetermined--;

Col. 5, Line 21, Claim 5, "tie down" should be --tie-down--; and

Col. 6, Line 24, Claim 7, "connecting" should be --connection--.

Signed and Sealed this

Fourteenth Day of March, 1995

*Attest:*

BRUCE LEHMAN

*Attesting Officer*     *Commissioner of Patents and Trademarks*